Dec. 30, 1969   J. T. LINGLE   3,487,335
FAST SWITCHING LOW INPUT VOLTAGE CONVERTER
Filed Oct. 27, 1967
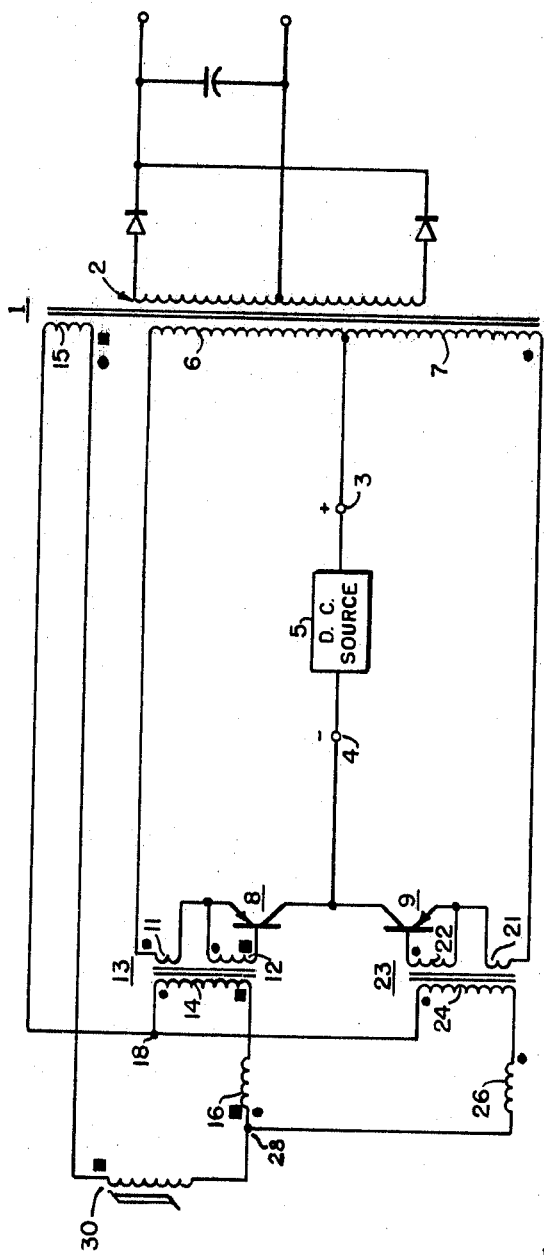
INVENTOR,
JOHN T. LINGLE.
BY Milton W. Lee    AGENT
Harry M. Saragovitz
Edward J. Kelly + Herbert Berl
ATTORNEYS.

United States Patent Office 3,487,335
Patented Dec. 30, 1969

3,487,335
FAST SWITCHING LOW INPUT VOLTAGE CONVERTER
John T. Lingle, Bloomington, Minn., assignor, by mesne assignments, to the United States of America as represented by the Secretary of the Army
Filed Oct. 27, 1967, Ser. No. 678,679
Int. Cl. H03k 3/28, 3/335
U.S. Cl. 331—113      3 Claims

ABSTRACT OF THE DISCLOSURE

A DC to DC voltage converter comprising a transistor oscillator connected to an output transformer having a feedback winding coupled back to the transistor circuit through a first saturable reactor and a pair of current transformers for controlling the switching time of each transistor. A saturable reactor is placed in the primary winding of each current transformer in series relationship with the first saturable reactor, whereupon, saturation of the first reactor provides a momentary discharge of the stored energy therein through the primary winding and saturable reactor of each respective current transformer, thereby reversing the biasing potentials on each transistor and changing the state of conduction thereof.

BACKGROUND OF THE INVENTION

This invention relates to high-power converters and more particularly to efficient transistor DC to DC converters utilizing fast switching techniques with very low power dissipation.

Those concerned with the development of transistor circuits for converting DC to DC or AC have long recognized the need for minimizing the switching delay caused by hole storage in semiconductor switches and for minimizing transient voltage conditions during the period of transistion from a fully conducting transistor to a nonconducting transistor and vice versa.

SUMMARY OF THE INVENTION

The present invention contemplates the use of a transformer coupled feedback system utilizing saturable reactors for quickly extinguishing the conduction of a fully conducting transistor in an oscillator network while simultaneously switching the paired nonconducting transistor into its fully conducting state. Alternate charging and discharging of the saturable reactors produces high voltage pulses for sweeping out stored holes in the semiconductors, minimizing voltage transient time, and quickly switching the transistors.

The general purpose of this invention is to provide a DC to DC transistor voltage converter capable of extremely fast and efficient switching. A transistor oscillator is connected to an output transformer having a feedback winding for controlling conduction of the transistors. The feedback winding is coupled back to the transistor circuit through a first saturable reactor and a pair of current transformers. Upon saturation of the first saturable reactor, negative feedback is applied through a pair of saturable reactors, series connected in the primary windings of the current transformers for momentarily decoupling the transistors during the recycle period.

BRIEF DESCRIPTION OF THE DRAWING

The exact nature of this invention will be readily apparent from consideration of the following specification relating to the annexed drawing which is a detailed circuit diagram of the basic circuit configuration of a new and improved power inverter constructed in accordance with the principles of the present invention.

DESCRIPTION OF THE INVENTION

In the improved power inverter circuit shown in the drawing, the transistors are used to switch the polarity of the supply across the primary of a transformer 1. A square-wave voltage is induced in the secondary winding 2 and full-wave rectification then gives DC with little ripple.

In a self-oscillating converter, feedback windings on the output transformer drive the switching transistors, and switching generally occurs when the transformer core saturates. However, in the instant invention, a network of saturable reactors is utilized for switching rather than saturable core transformers.

The DC power supply terminal 3 and terminal 4 may be connected to any source of DC capable of furnishing the desired power. The DC source may be a full wave rectifier for rectifying an AC input voltage or it may be a conventional battery. In either instance, an initial current will flow from source 5 through windings 6 and 7 into the bases of transistors 8 and 9, causing the transistor with the higher beta characteristic to conduct first. The transistor current necessary to initiate oscillations is considerably less than the full load current. Auxiliary starting circuits are sometimes used for initiating oscillations, for example, a capacitive network of a few microfarads may be momentarily connected between the collector and emitter of one of the transistors.

The transistors shown in the drawing are depicted to be of the PNP type, but the operation of the circuit using NPN types is exactly the same, except for the reversal of all polarities.

Assuming that transistor 8 has the greater beta characteristic and will begin to conduct before transistor 9 then current will flow from source 5 at terminal 3 through portion 6 of the primary winding of transformer 1 through winding 11 of transformer 13, the emitter-collector path of transistor 8 and back to the negative terminal 4 of source 5. As the current increases through winding 11, a voltage is induced across winding 12 of transformer 13 to render the base of transistor 8 highly negative with respect to the emitter and thus biases transistor 8 into its forward state of conduction. As the current increases through winding 11, there is a corresponding increase in current through portion 6 of the primary winding of transformer 1, which induces a potential across feedback winding 15. The current associated with the induced voltage across winding 15 flows through the primary winding 14 and 24 of current transformers 13 and 23, the reactors 16 and 26, and reactor 30. This additional feedback is negative; however, it does not immediately become effective because it is blocked for one-half cycle by the high impedance of unsaturated reactor 30. Positive feedback to maintain transistor 8 conductive is provided by induced voltages in transformer 13. The induced voltage in winding 14 on transformer 13 causes current to flow through terminal 18, winding 24 on transformer 23, reactor 26, terminal 28, and reactor 16 to the other end of winding 14 on transformer 13. The current flow through this path provides positive feedback by inducing a voltage in winding 22 of transformer 23 which applies positive potential to the base-emitter junction of transistor 9 maintaining it non-conductive for the half-cycle that transistor 8 is conducting. The current through windings 14 and 24 and through reactors 26 and 16 also resets the magnetic cores of reactors 26 and 16 to provide proper steering for the next recycle pulse.

After a short interval of time, reactor 30 saturates to apply negative feedback to transformer 13 or 23. Transformers 13 and 23 are separate current feedback transformers with windings 14 and 24 connected in parallel through reactors 16 and 26, respectively. Since these small reactors 16 and 26 had been reset during the previous half cycle, one reactor will present a low impedance to the recycle pulse allowing the recycle pulse to flow to the base of the formerly conducting transistor through its respective feedback transformer and render it non-conductive. Meanwhile, the other reactor will present a high impedance to the recycle pulse for a few microseconds and delay the turn-on of the formerly non-conductive transistor. The reactors 16 and 26 serve as steering impedances to the recycle pulse and one reactor presents a high momentary impedance to decouple transformers 13 and 23 and thus transistors 8 and 9 for a few microseconds during the switching interval. When reactor 30 saturates, a recycle pulse will be applied between terminals 18 and 28, and with the square dot polarities shown, transistor 8 will be back biased to a much higher than normal voltage. The square dots denote the recycle pulse and the round dots denote the normal half cycle pulse. The reactors 16 and 26 decouple transistors 8 and 9 so that the switching "off" transistor is back biased to a higher voltage for more rapid switching.

The recycle pulse which renders transistor 8 nonconductive will simultaneously initiate a potential across the base-emitter-junction of transistor 9 thus allowing transistor 9 to become conductive and to repeat the current cycle described for transistor 8 through winding portion 7 of transformer 1, winding 21 of transformer 23, the emitter-collector circuit of transistor 9 and back to source 5.

The principles underlying the above described invention may further be utilized effectively in silent power sources and in sophisticated DC to DC converters. Various other modifications are in fact contemplated and may obviously be resorted to by those skilled in the art without departing from the spirit and scope of the invention.

I claim:
1. A direct current power converter, comprising:
   a pair of input terminals for providing a direct current input signal;
   an output transformer having a center tapped primary winding, a feedback winding and an output winding;
   a transistor oscillator circuit including at least a first and a second transistor connected for alternate conduction;
   feedback means to couple positive feedback from the main power flow path to the base of each transistor in the oscillator circuit for driving the first transistor into saturation while holding the second transistor in its non-conducting state and vice versa;
   a first saturable reactor connected in series with said feedback winding;
   means for coupling the feedback winding of the output transformer to the base of each transistor in the oscillator circuit including a pair of current transformers, each having a first primary winding connected in series with the feedback winding of the output transformer and said first saturable reactor and further having a secondary winding connected to the base of each transistor respectively, whereupon saturation of said first reactor provides a momentary discharge of the stored energy therein through the primary winding of each respective current transformer, thereby reversing the biasing potentials on each transistor for changing the state of conduction thereof;
   one of said pair of input terminals connected to the center tapped primary winding and the other of said pair of input terminals connected to said transistor circuit;
   said center tapped primary winding being connected across the transistor oscillator circuit, whereby a first portion of the primary winding is connected in series with the emitter-collector junction of said first transistor and the DC input, and the remaining portion of the primary winding is connected in series with the emitter-collector junction of the second transistor and the DC input, thereby providing two separate alternatively conducting paths.

2. A direct current power converter as defined in claim 1, wherein said positive feedback means comprises a second primary winding on each of said pair of current transformers, said second primary windings being connected in series with respective portions of the primary winding of the output transformer and the emitter-collector path of each individual transistor respectively, whereby upon the switching of each transistor from its nonconducting to its conducting state, said second primary winding induces a forward biasing voltage across the base-emitter junction of the transistor through the secondary winding of the current transformer for rapid switching of the transistor and for maintaining said transistors properly biased.

3. A direct current power converter as defined in claim 2 further including second and third saturable reactors connected in series with the first primary winding of each respective current transformer, whereby decoupling of the transistors from said feedback winding of the output transformer occurs for a few microseconds upon application of the recycle pulse from the first saturable reactor.

References Cited

UNITED STATES PATENTS 2,937,298   5/1960   Putkovich et al.
3,323,075   5/1967   Lingle.

ROY LAKE, Primary Examiner

S. H. GRIMM, Assistant Examiner

U.S. Cl. X.R.
321—2